United States Patent
Liao et al.

(10) Patent No.: US 9,939,272 B1
(45) Date of Patent: Apr. 10, 2018

(54) METHOD AND SYSTEM FOR BUILDING PERSONALIZED KNOWLEDGE BASE OF SEMANTIC IMAGE SEGMENTATION VIA A SELECTIVE RANDOM FIELD APPROACH

(71) Applicant: TCL RESEARCH AMERICA INC., San Jose, CA (US)

(72) Inventors: Xinpeng Liao, San Jose, CA (US); Xiaobo Ren, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 15/400,233

(22) Filed: Jan. 6, 2017

(51) Int. Cl.
- *G06K 9/62* (2006.01)
- *G01C 21/00* (2006.01)
- *G06K 9/32* (2006.01)
- *G06T 7/12* (2017.01)
- *G06T 7/143* (2017.01)

(52) U.S. Cl.
CPC ......... *G01C 21/005* (2013.01); *G06K 9/3241* (2013.01); *G06T 7/12* (2017.01); *G06T 7/143* (2017.01); *G06T 2207/20076* (2013.01); *G06T 2207/20081* (2013.01); *G06T 2207/20084* (2013.01); *G06T 2207/20116* (2013.01)

(58) Field of Classification Search
CPC ....... H04W 8/26; H04W 92/24; H04W 40/00; H04W 40/02

USPC ....... 382/156, 157, 159, 165, 199, 266, 282, 382/291; 128/925; 706/15, 25

See application file for complete search history.

(56) References Cited

U.S. PATENT DOCUMENTS

| | | | | |
|---|---|---|---|---|
| 7,310,644 | B2 * | 12/2007 | Adya | G06F 17/30156 |
| 7,349,913 | B2 * | 3/2008 | Clark | G06F 17/30174 |
| 7,389,393 | B1 * | 6/2008 | Karr | G06F 3/0613 |
| | | | | 711/103 |
| 7,805,401 | B2 * | 9/2010 | Toner | G06F 17/30079 |
| | | | | 707/609 |
| 7,805,461 | B2 * | 9/2010 | Gadamsetty | G06F 17/30958 |
| | | | | 707/797 |
| 8,233,715 | B2 * | 7/2012 | Matsushita | G06K 9/00 |
| | | | | 348/241 |
| 8,843,515 | B2 * | 9/2014 | Burris | G06F 17/3087 |
| | | | | 707/769 |

* cited by examiner

*Primary Examiner* — Yosef Kassa

(74) *Attorney, Agent, or Firm* — Anova Law Group, PLLC

(57) ABSTRACT

The present invention discloses a method for recommending an image-based route. The method includes: obtaining a query image from a user; performing an interactive segmentation process to determine one or more contours of an object-of-interest in the query image; determining a route having the maximum area overlap with the one or more contours of the object-of-interest on a map image; generating an output image including the object-of-interest and the route having the maximum area overlap with the contours of the object-of-interest; and recommending the output image to the user, and sharing the output image on a social network platform.

12 Claims, 5 Drawing Sheets

METHOD AND SYSTEM FOR BUILDING PERSONALIZED KNOWLEDGE BASE OF SEMANTIC IMAGE SEGMENTATION VIA A SELECTIVE RANDOM FIELD APPROACH

FIELD OF THE DISCLOSURE

The present disclosure generally relates to the field of the computer vision and, more particularly, relates to a method and system for building personalized knowledge base of semantic image segmentation via a selective random field approach.

BACKGROUND

Semantic image segmentation is a pixel-level labeling task to divide an image into meaningful, non-overlapping regions. In complex images, whether the segmentation is meaningful or not depends on the user's intention of what he wants to extract from the image. It is extremely challenging, if not impossible, to devise a universal approach to segment images as accurately as one would expect. This makes the problem highly ill-posed, thus user interaction is indispensable, which increases user's interaction workload.

Recent approaches have attempted to harness the capabilities of deep learning techniques for image recognition to tackle pixel-level labelling tasks. One central issue in this methodology is the limited capacity of deep learning techniques to delineate visual objects that commonly result in non-sharp boundaries and blob-like shapes in semantic segmentation tasks. Convolutional Neural Networks (CNNs) lack smoothness constraints that encourage label agreement between similar pixels, and spatial and appearance consistency of the labelling output. Such smoothness constraints can be incorporated by formulating the mean-filed approximate inference for dense Conditional Random Field (CRF) as Recurrent Neural Network (RNN) which can refine the coarse outputs from the traditional CNN in forward pass while passing error derivatives back to the CNN during training. However, such Deep Neural Networks (DNN) are mostly refined on the benchmarking datasets without considering any user interactions.

The disclosed methods and systems are directed to solve one or more problems set forth above and other problems.

BRIEF SUMMARY OF THE DISCLOSURE

One aspect of the disclosed embodiments of the present invention provides a method for recommending an image-based route. The method includes: obtaining a query image from a user; performing an interactive segmentation process to determine one or more contours of an object-of-interest in the query image; determining a route having the maximum area overlap with the one or more contours of the object-of-interest on a map image; generating an output image including the object-of-interest and the route having the maximum area overlap with the contours of the object-of-interest; and recommending the output image to the user, and sharing the output image on a social network platform.

Optionally, performing an interactive segmentation process to determine one or more contours of an object-of-interest in the query image further including: feeding the query image through a fully connected convolutional network and a convolutional neural network message estimator for inferencing selective hidden-unit random field based on a personalized knowledge base; continuously back-propagating error derivatives with updated ground truth triggered by unsatisfied segmentation results of unseen images; and refining semantic segmentation and learning super-pixel selection criterion to build the personalized knowledge base.

Optionally, given a set of observations x and the parameters θ, the conditional probability of the segmentation label s is modeled as:

$$p(s = s_1, \ldots s_N | x, \theta) = \sum_h p(s, h | x, \theta) = \frac{\sum_h \exp(\psi(s, h, x; \theta))}{\sum_s \sum_s \exp(\psi(s, h, x; \theta))}$$

where $\psi(s,h,x;\theta) = \Sigma_i \phi_i^b(x_i,h_i) + \Sigma_{i,j \in E} \phi_{ij}^g(h_i,h_j,x_i,x_j) + \Sigma_n (\Sigma_i \phi_i^p(s_n,h_i,x_i) + \phi^k(s_n))$; the parameters θ are estimated by maximizing:

$$L(\theta) = \sum_d \log(p(s_d | x_d, \theta)) - \frac{1}{2\sigma^2} \|\theta\|^2;$$

and the marginal distribution is calculated:

$$p(s_n | x, \theta) = \sum_{s \setminus s_n} p(s | x, s_n) = \frac{1}{Z_n} \exp\left[\sum_{F \in \mathcal{F}_p} \beta_{F \to p}(s_n)\right]$$

where $Z_n$ is a normalizes:

$$Z_n = \sum_{s_n} \exp\left[\sum_{F \in \mathcal{F}_p} \beta_{F \to p}(s_n)\right].$$

Another aspect of the disclosed embodiments of the present invention provides a system for recommending an image-based route. The system includes: an interactive segmentation module configured to obtain a query image from a user and perform an interactive segmentation process to determine on or more contours of an object-of-interest in the query image; a route searching module configured to determine a route having the maximum area overlap with the one or more contours of the object-of-interest on a map image; and a route recommending module configured to generate an output image including the object-of-interest and the route having the maximum area overlap with the contours of the object-of-interest, and to recommend the output image with the route to the user to be shared on a social network platform.

Optionally, the interactive segmentation module includes: an image selection unit configured to allow the user to select a query image; an image editing unit configured to allow the user to edit the super-pixel contour overlapping the query image by providing the foreground and background constraints; an image processing unit configured to process the query image to generate one or more super-pixel contours through semantic image segmentation; and a personalized knowledge base unit configured to adaptively learn the user preferences or selection criteria with contextual cues in unseen settings to reduce the image editing effort by the user and replace the user interactions eventually.

Optionally, the image processing unit also extracts and sends the feedback from the user image editing to the personalized knowledge base unit; and the semantic image segmentation is performed through a selective random field approach.

Optionally, the image processing unit further includes a fully convolutional network and a super-pixel selector.

Optionally, the route searching module searches a route on Google map with a MorphSnakes algorithm.

Optionally, the route recommending module recommends a route having the maximum overlap area with the super-pixel contour generated by the interactive segmentation module to the user.

Another aspect of the disclosed embodiments of the present invention provides a non-transitory computer-readable medium having computer program for, when being executed by a processor, performing a method for recommending an image-based route. The method includes: obtaining a query image from a user; performing an interactive segmentation process to determine one or more contours of an object-of-interest in the query image; determining a route having the maximum area overlap with the one or more contours of the object-of-interest on a map image; generating an output image including the object-of-interest and the route having the maximum area overlap with the contours of the object-of-interest; and recommending the output image to the user, and sharing the output image on a social network platform.

Other aspects of the present disclosure can be understood by those skilled in the art in light of the description, the claims, and the drawings of the present disclosure.

BRIEF DESCRIPTION OF THE DRAWINGS

The drawings described herein are intended to provide a further understanding of the present invention and form a part of the specification. The illustrative embodiments and descriptions thereof are intended to illustrate the present invention and are not to be construed as limiting the scope of the present invention. In the drawings.

DETAILED DESCRIPTION

In order to provide those skilled in the art with a better understanding of the present invention, the technical solutions according to the present invention are further described in detail with reference to the accompanying drawings of the exemplary embodiments. Wherever possible, the same reference numbers will be used throughout the drawings to refer to the same or like parts. It should be understood that the exemplary embodiments described herein are only intended to illustrate and explain the present invention and not to limit the present invention. Other embodiments obtained by those of ordinary skill in the art without creative effort based on the described exemplary embodiments should be encompassed within the scope of the present invention.

In accordance with some embodiments of the present disclosure, a method for building personalized knowledge base of semantic image segmentation via a selective random field approach and system thereof are provided. Specifically, the disclosed method and system can be used for recommending and sharing customized image-based route.

In certain embodiments, the disclosed method and system can be initiated with a query image with specified object bounding box, user geographical location, map ratio, and expected route length, and/or other information. Given any query image, an interactive segmentation can be performed to ensure a precise segmentation for the object-of-interest in the query image. A contour of the object-of-interest can be generated for searching a route on a map based on a matching algorithm. Routes candidates can be naturally generated with a metric to evaluate the convergence of contour evolution in the light of its stability when the curve contour approaches the desired routes. In addition, the distortion error between each route candidate and user-specified contour can be minimized by performing a shrinking minimization process, hereby finalizing the matched route as the best recommendation to the user after output rendering.

Figure 1:
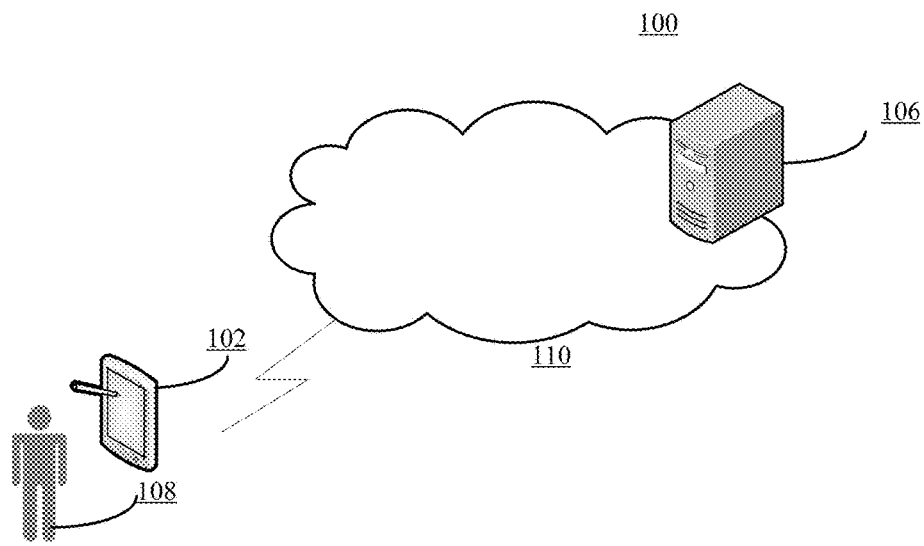
FIG. 1 illustrates an exemplary environment incorporating certain embodiments of the present disclosure.

FIG. 1 illustrates an exemplary environment 100 incorporating certain embodiments of the present invention. As shown in FIG. 1, environment 100 may include a terminal 102, a server 106, a user 108, and a network 110.

A terminal 102 (also known as a terminal device) may refer to any appropriate user terminal with certain computing capabilities, such as a personal computer (PC), a work station computer, a server computer, a hand-held computing device (tablet), a smartphone or mobile phone, or any other user-side computing device. In certain embodiments, the terminal 102 may be a mobile terminal device, such as a smartphone, a tablet computer, or a mobile phone, etc. The mobile terminal 102 may be implemented on any appropriate computing platform.

The terminal 102 may be used by any user 108 to connect to the network 110 and make requests to server 106. Each user 102 may use one or more terminals 102. As directed by the user 108, the terminal 102 may obtain multimedia content, such as image, video, audio, text, etc., from any appropriate sources, such as from a local storage device, from a wired or wireless network device of a service provider, or from the Internet.

Further, the server 106 may refer to one or more server computers configured to provide certain map functionalities and social media platform functionalities (e.g., map search server, image sharing platform server, etc.). The server 106 may include one or more processors to execute computer programs in parallel. The server 106 may store map information to be accessed by terminals. The server 106 may also provide various social media platforms to the terminal 102 as requested by the user 108. The server 106 may also be a cloud server.

Terminals 102 and servers 106 may communicate with each other through communication network 110, such as a cable network, a broadband network, a wireless network, and/or a satellite network, etc. Although one user 108, one terminal 102, and one server 106 are shown in FIG. 1, any number of users, terminals, and/or servers may be included.

Figure 2:
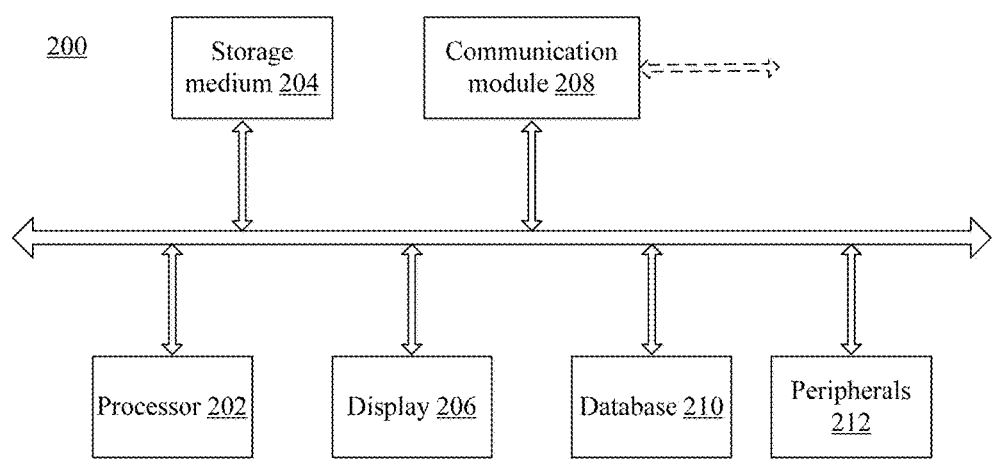
FIG. 2 illustrates an exemplary computing system consistent with certain embodiments of the present disclosure.

The terminal 102, and/or the server 106 may be implemented on any appropriate computing circuitry platform. FIG. 2 shows a block diagram of an exemplary computing system 200 capable of implementing the terminal 102, and/or the server 106.

As shown in FIG. 2, the computing system 200 may include a processor 202, a storage medium 204, a display 206, a communication module 208, a database 210, and peripherals 212. Certain devices may be omitted and other devices may be included.

The processor 202 may include any appropriate hardware processor or processors. Further, the processor 202 can include multiple cores for multi-thread or parallel processing. The storage medium 204 may include memory modules, such as ROM, RAM, flash memory modules, and mass storages, such as CD-ROM and hard disk, etc. The storage medium 204 may store computer programs for implementing various processes, when the computer programs are executed by the processor 202.

Further, the peripherals 212 may include various sensors and other I/O devices, such as a keyboard, a mouse, and a touch screen, etc. The communication module 208 may include certain network interface devices for establishing connections through communication networks. The database 210 may include one or more databases for storing certain data and for performing certain operations on the stored data, such as database searching.

In operation, the user 108 may indicate, through the terminal 102, a query image available on the terminal 102 or online from various servers 106. An interactive segmentation of the query image can be performed between the user 108 and the terminal 102 to obtain an object-of-interest in the query image. The terminal 102 can generate object contour for searching the route on a map application from a server 106. The route having the maximum area overlap with the contour of object-of-interest can be recommended to the user 108, and can be shared on one or more social network platforms on the servers 106.

Semantic segmentation regarding algorithmic approaches efficiently computes minimum energy solutions for respective cost functions, using graph cuts, level set methods, random walks, and convex relaxation techniques, etc. Despite substantial algorithmic advances, state-of-the-art approaches to interactive image segmentation often fail for scenes of complex color variability, where objects have similar colors and may be exposed to difficult lighting conditions.

In certain embodiments, it is assumed that everyone has relatively stable personal traits. A selective random field approach may be used to build personalized knowledge base for reducing the user interaction workload over time. An end-to-end trainable network consisting of a fully connected convolutional network and a selective hidden-unit Conditional Random Field (CRF) is pre-trained on a given image dataset, e.g., the personal image collection. Any user interactions with the updated ground truth triggered by unsatisfied segmentation results of unseen images are then continuously back-propagated in the form of error derivatives. The selection criterion of whether triggering such updates is represented by binary hidden variables of a selective hidden-unit CRF.

A new Deep Neural Network (DNN) formulation of super-pixel selection criterion has been established with hidden-unit CRF. A super-pixel based formulation is used to refine semantic segmentation and learn the selection criterion simultaneously. The selective random field approach according to the various embodiments of the present invention is a very generic open scheme that could be used for exploiting domain-specific contextual cues for other settings such as autonomous vehicle navigation, where an appropriate formulation of selection criterion would replace the existing one for semantic segmentation.

A trainable end-to-end model-inference-selection learning scheme may be used so that the super-pixel selection criterion is also learned during user interactions in semantic segmentation. Toward this end, a selective hidden-unit random field that has binary stochastic hidden variables to represent a selection criterion for features computed for observed data is formulated. In the context of semantic segmentation, these binary stochastic hidden variables are used to infer whether a given image region is within the user's interests. Such user interests may exhibit great variety of objects-of-interest. For example, one may be particularly interested in animals while another person might only be fascinated with images of spiritual gods. Casting these personalized traits onto binary stochastic hidden variables to learn the super-pixel selection criterion is the objective of the present invention.

Figure 3:
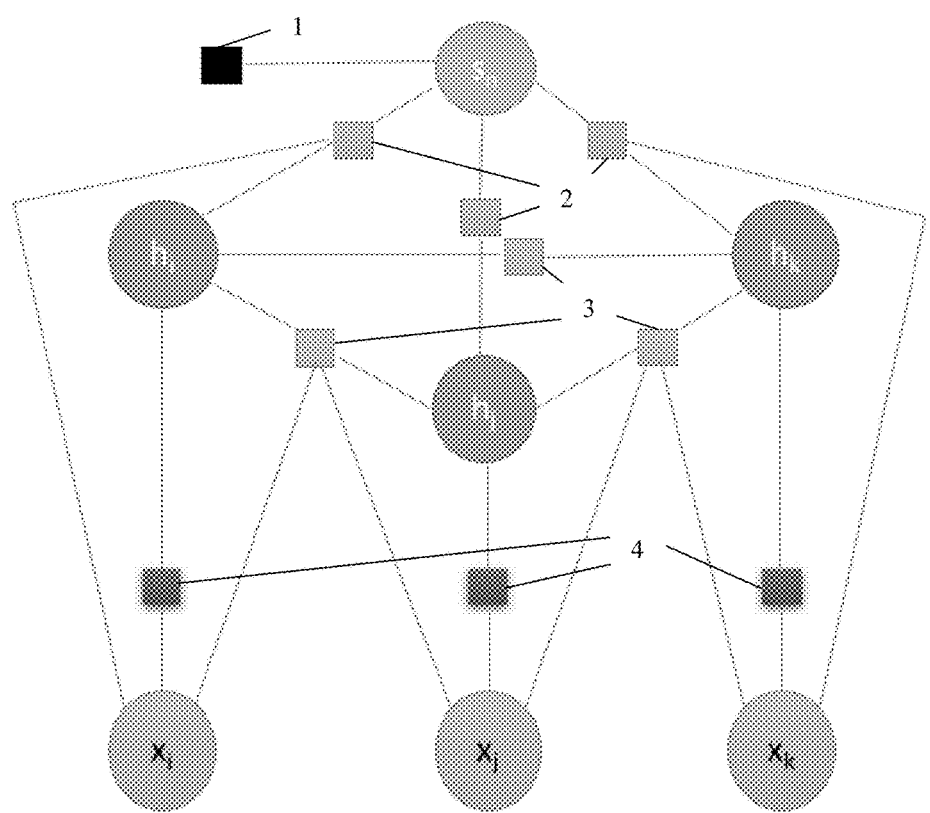
FIG. 3 illustrates a factor graph representation of selective random field for super-pixels consistent with certain embodiments of the present disclosure.

FIG. 3 illustrates a factor graph representation of selective random field for super-pixels consistent with certain embodiments of the present disclosure. $x_i$ represents the information extracted from the $i^{th}$ super-pixel of an image using different experts such as edge detectors, appearance features, visual vocabulary and convolutional feature maps. $h_i$ is a latent binary stochastic variable representing whether the $i^{th}$ super-pixel is of interest, and $s_n$ represents the segmentation label (foreground/background) for $n^{th}$ connected super-pixels in the image. The groups of boxes represent the factors computed for the connected variable nodes; factors of the same group are of the same form and share parameters. Given a set of observations x and the parameters θ, the conditional probability of the segmentation label s is modeled as:

$$p(s = s_1, \ldots s_N | x, \theta) = \sum_h p(s, h | x, \theta) = \frac{\sum_h \exp(\psi(s, h, x; \theta))}{\sum_s \sum_h \exp(\psi(s, h, x; \theta))} \quad (1)$$

where $$\psi(s,h,x;\theta) = \Sigma_i \phi_i^b(x_i,h_i) + \Sigma_{i,j \in E} \phi_{ij}^g(h_i,h_j,x_i,x_j) + \Sigma_n(\Sigma_i \phi_i^p (s_n,h_i,x_i) + \phi^k(s_n)) \quad (2)$$

A new DNN formulation of super-pixel selection criterion has been established with hidden-unit CRF. A super-pixel based formulation is used to refine semantic segmentation and learn the selection criterion simultaneously. The selective random field approach according to the various embodiments of the present invention is a very generic open scheme that could be used for exploiting domain-specific contextual cues for other settings such as autonomous vehicle navigation, where an appropriate formulation of selection criterion would replace the existing one for semantic segmentation.

In Equation (2), i, j∈E implies that the $i^{th}$ and $j^{th}$ super-pixels share a boundary, and are similar in appearance. The factors φ have the following semantics. $\phi_i^b(x_i, h_i)$ computes a value reflective of its likelihood of presence of foreground in the $i^{th}$ super-pixels (the boxes in group 4 as shown in FIG. 3). In particular, the pixel-wise prediction obtained from a fully convolutional neural network is used. $\phi_{ij}^g(h_i, h_j, x_i, x_j)$ denotes the neighborhood compatibility of connected super-pixels representing the similarity of the appearance in between (the boxes in group 3 as shown in FIG. 3). $\phi_i^p(s_n, h_i, x_i)$ denotes the selection criterion of super-pixels indicating whether they are contributing to the segmentation label $s_n$ for $n^{th}$ connected super-pixels in the image (the boxes in group 2 as shown in FIG. 3). $\phi^k(s_n)$ represents a prior information about the $n^{th}$ connected super-pixels in the image (the box in group 1 as shown in FIG. 3), which is modeled as Gaussian Mixture Models (GMMs).

Given the parameters $\theta$ and observed image x consisting of a set of super-pixels, the label is given by $\text{argmax}_s p(s=s_1, \ldots, s_N|x, \theta)$. The parameters $\theta$ are estimated by maximizing:

$$L(\theta) = \sum_d \log(p(s_d | x_d, \theta)) - \frac{1}{2\sigma^2}\|\theta\|^2 \tag{3}$$

Computing the gradient of $L(\theta)$ and $p(s=s_1, \ldots, s_N|x, \theta)$ involves the evaluation of quantities like the partition function $\Sigma_s \Sigma_h \exp(s, h, x; \theta)$. The presence of cycles in the connectivity graph prevents the use of exact methods for inference of these quantities. Thus, loopy belief propagation (LBP) is used for doing approximate inference in this factor graph.

In addition to deeply learning the messages in message passing inference where the message is a K-dimensional vector that encodes the information of the label distribution, Convolutional Neural Network (CNN) estimators are learned to directly output the required intermediate values in this LBP approximate inference algorithm. Specifically, for each variable-factor connection, the variable-to-factor message: $\beta_{p \to F} \in \mathbb{R}^K$, and the factor-to-variable message: $\beta_{F \to p} \in \mathbb{R}^K$ are recursively computed. Once all the factor-to-variable messages of one variable node are obtained, marginal distribution (beliefs) of that variable may be calculated:

$$p(s_n | x, \theta) = \sum_{s \setminus s_n} p(s | x, s_n) = \frac{1}{Z_n} \exp\left[\sum_{F \in \mathcal{F}_p} \beta_{F \to p}(s_n)\right] \tag{4}$$

where $Z_n$ is a normalizer: $Z_n = E_{s_n} \exp[\Sigma_{F \in \mathbb{R}_p} \beta_{F \to p}(s_n)]$.

Figure 4:
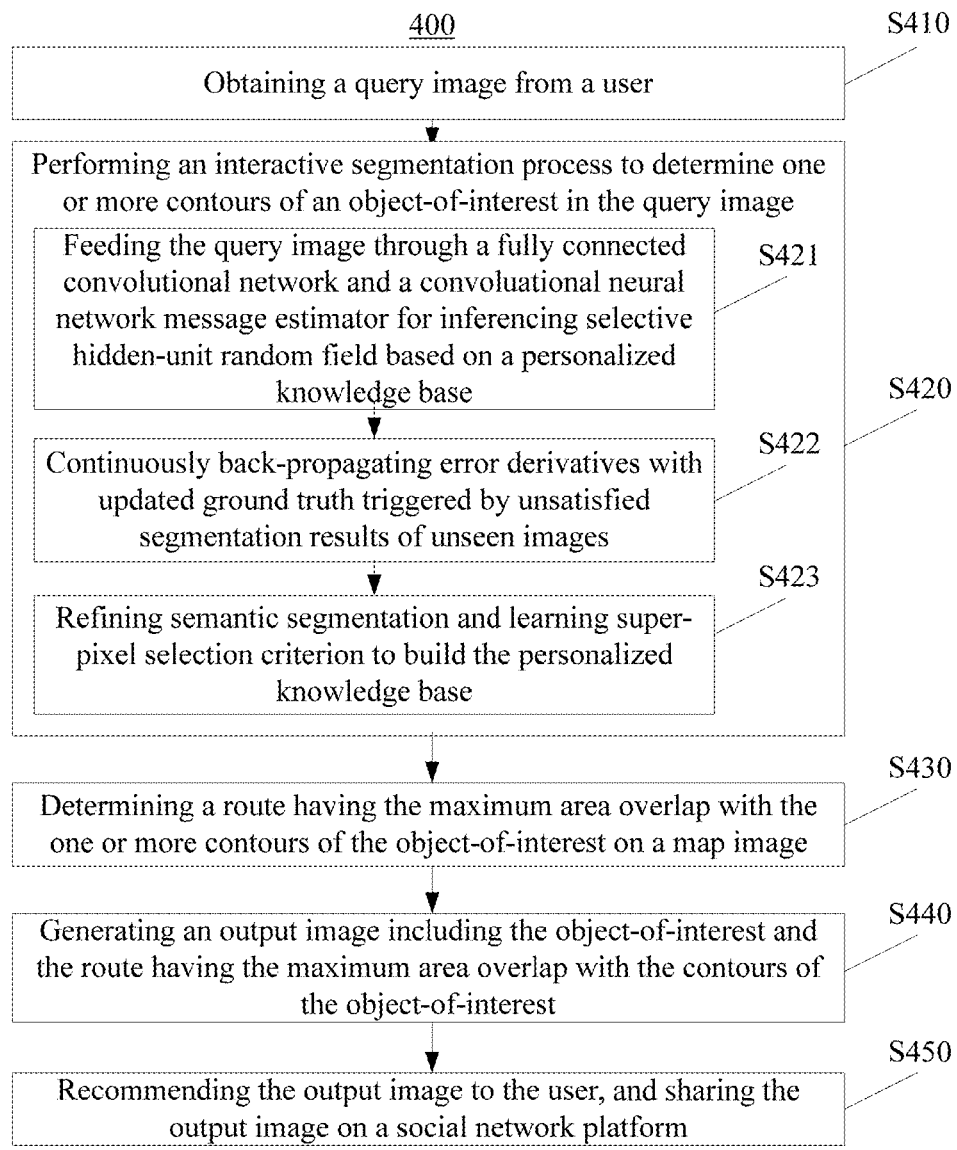
FIG. 4 illustrates a flowchart of an exemplary method for recommending and sharing customized multimedia route planning consistent with certain embodiments of the present disclosure.

FIG. 4 illustrates a flowchart of an exemplary method for recommending and sharing customized multimedia route planning consistent with certain embodiments of the present disclosure. As shown in FIG. 4, the disclosed method 400 may include the following steps.

Step S410: obtaining a query image from a user.

Specifically, the query image may be obtained from any suitable sources, such as a camera input, a local or cloud photograph album, a webpage, a video frame capture tool, etc. In certain embodiments, the query image may be received with additional user specified information, including an object bounding box, a user geographical location, a map ratio, and an expected route length, etc.

Step S420: performing an interactive segmentation process to determine one or more contours of an object-of-interest in the query image.

Specifically, an initial trimap may be obtained by performing an initialization of the query image. The term of trimap used herein referred to an image including three identified regions: a foreground region, a background region, and a remaining region. Further, the initialization of a trimap may also include setting Gaussian Mixture Models (GMMs) to each pixel in the initial foreground region and the initial background region. In certain embodiments, the segmentation process may be realized by using an iterative energy minimization method.

The step S420 may further include the following substeps.

Step S421: feeding the query image through a fully connected convolutional network and a convolutional neural network message estimator for inferencing selective hidden-unit random field based on a personalized knowledge base.

Step: S422: continuously back-propagating error derivatives with updated ground truth triggered by unsatisfied segmentation results of unseen images.

Step: S423: refining semantic segmentation and learning super-pixel selection criterion to build the personalized knowledge base.

Specifically, it is assumed that everyone has relatively stable personal traits. A selective random field approach may be used to build personalized knowledge base for reducing the user interaction workload over time. An end-to-end trainable network consisting of a fully connected convolutional network and a selective hidden-unit CRF is pre-trained on a given image dataset, e.g., the personal image collection. Any user interactions with the updated ground truth triggered by unsatisfied segmentation results of unseen images are then continuously back-propagated in the form of error derivatives. The selection criterion of whether triggering such updates is represented by binary hidden variables of a selective hidden-unit CRF.

A new DNN formulation of super-pixel selection criterion has been established with hidden-unit CRF. A super-pixel based formulation is used to refine semantic segmentation and learn the selection criterion simultaneously. The selective random field approach according to the various embodiments of the present invention is a very generic open scheme that could be used for exploiting domain-specific contextual cues for other settings such as autonomous vehicle navigation, where an appropriate formulation of selection criterion would replace the existing one for semantic segmentation.

Step S430: determining a route having the maximum area overlap with the one or more contours of the object-of-interest on a map image.

Specifically, based on the one or more contours of the object-of-interest, a route having the maximum area overlap with the one or more contours of object-of-interest may be determined on a map image.

In some embodiments, a map may be obtained from any suitable map application, such as Google map, Bing map, Tomtom map, Garmin map, etc. A map image may be generated based on the user geographical location and map ratio received at step S410.

Step S440: generating an output image including the object-of-interest and the route having the maximum area overlap with the contours of the object-of-interest.

Specifically, an output image including the object-of-interest, and the route having the maximum area overlap with the contour of the object-of-interest may be generated.

In some embodiments, the output image may be generated by using any suitable customizable rendering techniques. For example, the object-of-interest can be half-transparently blended onto the matched route indicating the resemblance between a desirable feature and a target share.

Step S450: recommending the output image to the user, and sharing the output image on a social network platform.

Finally, the output rendering result may be recommended to the user, e.g., presented on the display 206 of the terminal 102 to the user. Further, based on the instructions of the user, the output rendering result may be shared on one or more social network multimedia platforms, such as Facebook, WeChat, etc.

Accordingly, a method and a system for recommending and sharing customized multimedia route planning are provided. The disclosed method and system enable more personalized route planning for individuals with very active lifestyles. To build a bigger and more engaged audience, users may customize route planning, characterized by individual traits such as hobbies, personal goals, religious beliefs, and even the mood each time an exercise is needed.

In the disclosed method and system for recommending and sharing customized multimedia route planning, an interactive MorphSnakes algorithm enables more personalized route planning tailored for individuals based on their personal image collections. In order to find route candidates that are potentially matching user-specified contour after an interactive segmentation process, the interactive MorphSnakes algorithm may approximate numerical solutions of PDEs by successive application of a set of curvature morphological operators defined on a binary level set and with equivalent infinitesimal behavior. By introducing a metric to evaluate the convergence of curve evolution in the light of its stability when the curve approaches the desired routes. With this convergence criterion, routes candidates may be naturally generated. Further, the distortion error between each route candidate and user-specified contour may be minimized by performing a shrinking minimization process, thereby finalizing the best matched route as the recommendation to the user.

In some embodiments, the disclosed image-based route recommending and sharing method and system may be extended to other multimedia based target recommending and sharing. For example, besides the image input, a multimedia input may also include text, audio, video, animation, thumbnail, any other suitable type of media type input, or a combination thereof. Then the multimedia based target recommending and sharing method may interactively craft a desirable feature, such as a shape, a color, a dynamic condition, a rhythm, etc., from the multimedia input. Next, a target to be shared can be determined by a user. The obtained feature may then be overlaid on a target platform, e.g., a map application, a photograph album application, a media playback application, etc., to automatically craft and search the target share, e.g., a personalized route, a personalized picture, a personalized music, a personalized video, etc. After fusing the original multimedia input and the target share, the output may then be rendered for social-media sharing.

The disclosed customized multimedia route recommending and sharing method and system enable more personalized route planning tailored for individuals bored with routines and maintaining a very active lifestyle. For example, regular joggers/bikers could benefit from customizing various routes characterized by individual traits such as hobbies, personal goals, religious beliefs, and even the mood each time an exercise is needed. With the prevailing multimedia applications, personal multimedia content collections in mobile devices may be used for designing individual traits. And the personalized route may be recommended to users and may be shared on various social network multimedia platforms, thereby phenomenally changing the social dynamics to achieve better human interaction experiences.

Figure 5:
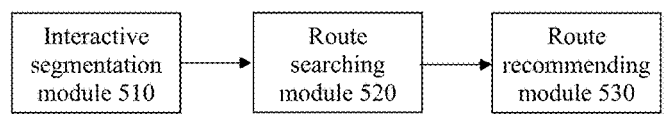
FIG. 5 illustrates a schematic diagram of an exemplary system for recommending and sharing customized multimedia route planning consistent with certain embodiments of the present disclosure.

FIG. 5 illustrates a schematic diagram of an exemplary system for recommending and sharing customized multimedia route planning according to the present disclosure. As shown in FIG. 5, the system includes an interactive segmentation module 510, a route searching module 520, and a route recommending module 530. Other modules may also be included.

The interactive segmentation module 510 is configured to obtain a query image from a user and perform an interactive segmentation process to determine on or more contours of an object-of-interest in the query image. Specifically, in the interactive segmentation module 510, the query image is fed through a fully connected convolutional network and a convolutional neural network message estimator for inferencing selective hidden-unit random field based on a personalized knowledge base. When the user provides the foreground and background constraints, the error derivatives are continuously back-propagated to the super-pixel selection process with updated ground truth triggered by unsatisfied segmentation results of unseen images. Then, the semantic segmentation is refined and the super-pixel selection criterion is learnt to build the personalized knowledge base, which is used to gradually reduce the user's workload.

The route searching module 520 is configured to determine a route having the maximum area overlap with the one or more contours of the object-of-interest on a map image. Specifically, a MorphSnakes algorithm may be employed to search route candidates in eight different orientations. A morphological Geodesic Active Contour (GAC) framework is used to evolve curves by minimizing an energy function. Then, an evaluation method is performed using MPEG-4 distortion error to generate a final match result.

The route recommending module 530 is configured to generate an output image including the object-of-interest and the route having the maximum area overlap with the contours of the object-of-interest. The output image is then recommended to the user and the user may share the output image on a social network platform.

The image-based route recommender apparatus enables more personalized route planning tailored for individuals bored with routines and maintaining a very active lifestyle. For example, regular joggers/bikers could benefit from customizing various routes characterized by individual traits such as hobbies, personal goals, religious beliefs, and even the mood each time an exercise is needed. With the prevailing multimedia applications, it is reasonably assumed that personal image collections in mobile devices can capture these individual traits to a certain degree. Based on such assumption, a personalized knowledge base of semantic image segmentation may be built through a selective random field approach.

A user may query an image with specified object bounding box, user geographical location, map ratio, and expected route length. Given any query image, an interactive segmentation may be used to ensure a precise segmentation for the object-of-interest, with object contour generated for searching the route on Google maps with MorphSnakes algorithms. The route having the maximum area overlap with the contour of object-of-interest is then recommended to the user. However, the image editing (interactive segmentation) required from the users is repetitively arduous especially in images with scenes of complex color variability, where objects have similar colors and may be exposed to difficult lighting conditions. Such a bottleneck could significantly benefit from building a personalized knowledge base via the proposed selective random field approach.

Figure 6:
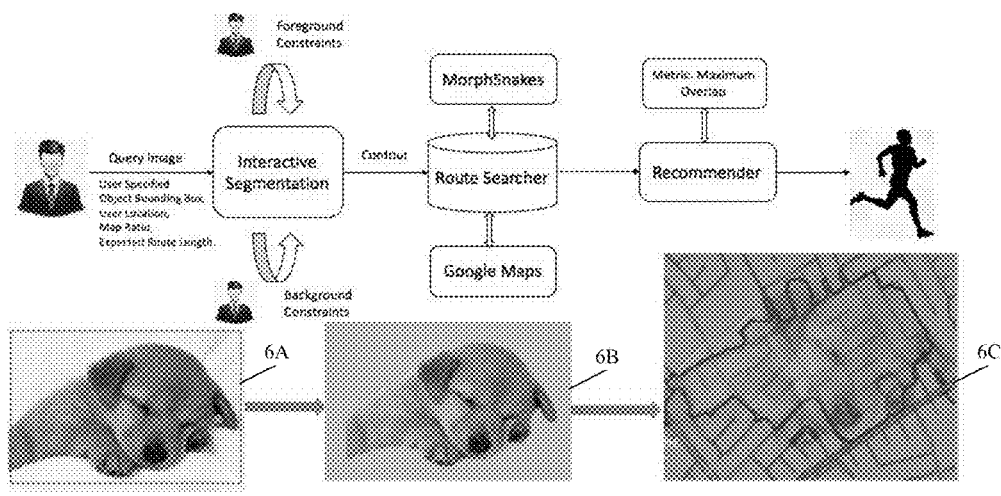
FIG. 6 illustrates a schematic diagram of another exemplary system for recommending and sharing customized multimedia route planning consistent with certain embodiments of the present disclosure.

FIG. 6 illustrates a schematic diagram of another exemplary system for recommending and sharing customized multimedia route planning consistent with certain embodiments of the present disclosure. As shown in FIG. 6, a user provides a query image (i.e., a dog picture 6A) along with additional information such as user specified object bounding box, user location, map ratio, expected route length to the interactive segmentation function block. After the interactive function block generates one or more contour candidates of the object-of-interest, the user provides foreground and background constraints to refine the semantic segmentation process. In the meantime, the foreground and background constraints are learned as the super-pixel selection criterion to build and enhance a personalized knowledge base. The resulting contours as shown in the dog picture 6B are provided to the route searcher function block.

The route searcher function block uses the contours received from the interactive segmentation function block to determine a route having the maximum area overlap with the one or more contours of the object-of-interest on a map image. Specifically, a MorphSnakes algorithm is employed to search route candidates in eight different orientations. A morphological Geodesic Active Contour framework is used to evolve curves by minimizing an energy function. The route candidate, as shown in the dog contour overlapped map image 6C, is sent to the recommender function block.

The recommender function block applies an evaluation method using MPEG-4 distortion error to the route candidate to generate a final match result. The verified route is then recommended to the user.

Figure 7:
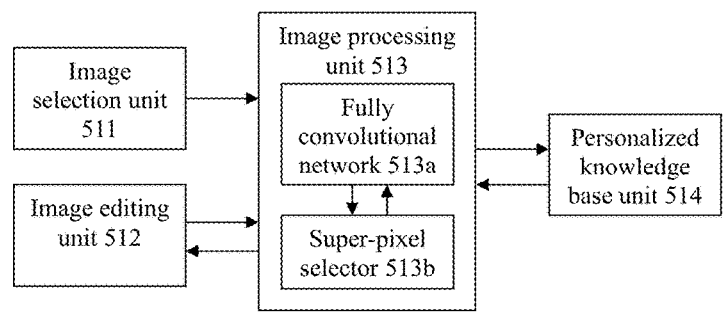
FIG. 7 illustrates a schematic diagram of an exemplary interactive segmentation module consistent with certain embodiments of the present disclosure.

FIG. 7 illustrates a schematic diagram of an exemplary interactive segmentation module consistent with certain embodiments of the present disclosure. As shown in FIG. 7, the interactive segmentation module includes an image selection unit 511, an image editing unit 512, an image processing unit 513, and a personalized knowledge base unit 514.

The image selection unit 511 is configured to allow the user to select a query image. The user may also enter a specified object bounding box, a user geographical location, a map ratio, and an expected route length, and/or other information.

The image editing unit 512 is configured to allow the user to edit the super-pixel contour overlapping the query image by providing the foreground and background constraints. Such image editing by the user is repetitively arduous especially in images with scenes of complex color variability, where objects have similar colors and may be exposed to difficult lighting conditions. Such a bottleneck could significantly benefit from building a personalized knowledge base via a selective random field approach consistent with the embodiments of the present disclosure.

The image processing unit 513 is configured to process the query image to generate one or more super-pixel contours through semantic image segmentation. In one embodiment, as shown in FIG. 7, the image processing unit 513 further includes a fully convolutional network 513a and a super-pixel selector 513b.

In certain embodiments, it is assumed that everyone has relatively stable personal traits. A selective random field approach may be used to build personalized knowledge base for reducing the user interaction workload over time. An end-to-end trainable network consisting of a fully connected convolutional network 513a and a selective hidden-unit Conditional Random Field (CRF) super-pixel selector 513b is pre-trained on a given image dataset, e.g., the personal image collection. Any user interactions with the updated ground truth triggered by unsatisfied segmentation results of unseen images are then continuously back-propagated in the form of error derivatives. The selection criterion of whether triggering such updates is represented by binary hidden variables of a selective hidden-unit CRF.

A fully convolutional network is trained end-to-end, pixels-to-pixels on semantic segmentation. The fully convolutional network (FCN) can efficiently learn to make dense predictions for per-pixel tasks like semantic segmentation. Both learning and inference are performed whole-image-at-a-time by dense feed forward computation and back propagation. In-network upsamlping layers enable pixel-wise prediction and learning in nets with sub-sampled pooling.

A new Deep Neural Network (DNN) formulation of super-pixel selection criterion has been established with hidden-unit CRF. A super-pixel based formulation is used to refine semantic segmentation and learn the selection criterion simultaneously. The selective random field approach according to the various embodiments of the present invention is a very generic open scheme that could be used for exploiting domain-specific contextual cues for other settings such as autonomous vehicle navigation, where an appropriate formulation of selection criterion would replace the existing one for semantic segmentation.

A trainable end-to-end model-inference-selection learning scheme may be used so that the super-pixel selection criterion is also learned during user interactions in semantic segmentation. Toward this end, a selective hidden-unit random field that has binary stochastic hidden variables to represent a selection criterion for features computed for observed data is formulated. In the context of semantic segmentation, these binary stochastic hidden variables are used to infer whether a given image region is within the user's interests. Such user interests may exhibit great variety of objects-of-interest. For example, one may be particularly interested in animals while another person might only be fascinated with images of spiritual gods. Casting these personalized traits onto binary stochastic hidden variables to learn the super-pixel selection criterion is the objective of the present invention.

The personalized knowledge base unit 514 is configured to adaptively learn the user preferences or selection criteria with contextual cues in unseen settings to reduce the image editing effort by the user and replace the user interactions eventually. The image processing unit 513 also extracts and sends the feedback from the user image editing to the personalized knowledge base unit 514.

Figure 8:
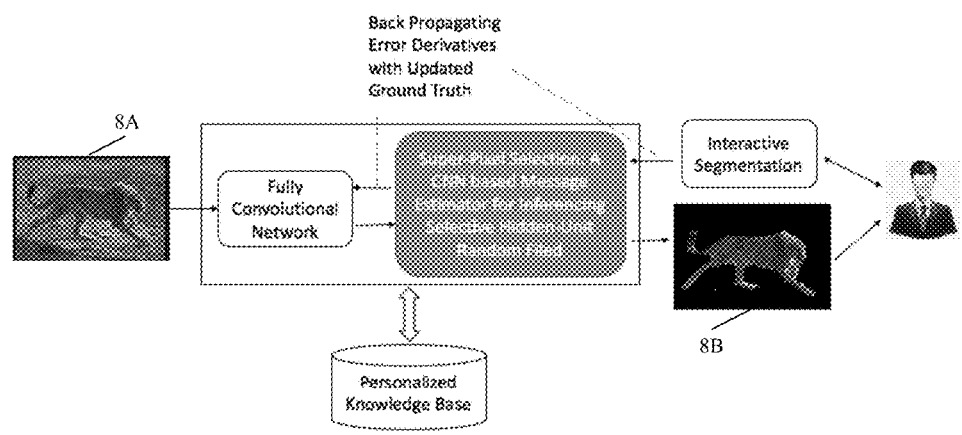
FIG. 8 illustrates a schematic diagram of another exemplary interactive segmentation module consistent with certain embodiments of the present disclosure.

FIG. 8 illustrates a schematic diagram of another exemplary interactive segmentation module consistent with certain embodiments of the present disclosure. As shown in FIG. 8, a query image 8A is fed to a fully convolutional network and a super-pixel selector. The fully convolutional network performs the semantic segmentation while the super-pixel selector generates one or more contours 8B in the query image.

On the other hand, the contours 8B in the query image are presented to a user for editing. The user input is back propagated in the form of error derivatives with updated ground truth to both the super-pixel selector and the fully convolutional network. At the same time, the user preferences learned by the fully convolutional network are used to build a personalized knowledge base. Once the personalized knowledge base is established, the super-pixel selector may apply the knowledge accumulated in the personalized knowledge base to the contour generation process.

By using the disclosed systems and methods, the interaction workload required from the users may be reduced gradually over time by building a personalized knowledge base with the assumption that each user has his/her own personal criteria/habits in image editing and such personal traits are relatively stable. A selective random field scheme is used to build personalized knowledge base. An end-to-end trainable network consisting of a fully connected convolutional network and a selective hidden-unit CRF is pre-trained on a given image dataset, e.g., the personal image collection. Any user interactions with the updated ground truth triggered by unsatisfied segmentation results of unseen images are then continuously back-propagated in the form of error derivatives. The selection criterion of whether triggering such updates is represented by binary hidden variables of a selective hidden-unit CRF. A super-pixel based DNN formulation is used to refine semantic segmentation and learn the selection criterion simultaneously. Further, although this formulation is derived from the application need for an image-based route recommender system that enables more personalized route planning, it is an open scheme that could be adapted for exploiting domain-specific contextual cues for many other settings such as autonomous vehicle navigation.

The disclosed embodiments of the present invention are described for illustration purpose only and are not to be construed as limiting the scope of the invention.

In the embodiments of the present invention described above, emphasis has been made to the description of each example. Certain aspect of the invention that is not described in detail in certain embodiment may be referred to the related description of the other embodiments.

It should be understood that the technical solutions disclosed in the embodiments of the present invention may be implemented in alternative manners. The embodiments of the apparatus described above are only for illustration purpose. For example, the units are partitioned based on the logical functions. In real life applications, other partition methods may be adopted. For example, a plurality of units or modules may be combined or integrated into another system. Certain features may be ignored or not implemented. Alternatively, the mutual coupling or direct coupling or communication connection illustrated or discussed above may be performed through certain interfaces, or implemented through indirect coupling or communication connection between the units or modules. The interconnection may be in the electrical form or other forms.

Various preferred embodiments of the present invention are described above. It should be noted that modifications and improvements may be made by those skilled in the art without departing from the principles of the present invention. Such modifications and improvements are considered as encompassed in the scope of the present invention.

What is claimed is:

1. A method for recommending an image-based route, comprising:
   obtaining a query image from a user;
   performing an interactive segmentation process to determine one or more contours of an object-of-interest in the query image;
   determining a route having a maximum area overlap with the one or more contours of the object-of-interest on a map image;
   generating an output image including the object-of-interest and the route having the maximum area overlap with the contours of the object-of-interest; and
   recommending the output image with the route to the user, and sharing the output image on a social network platform.

2. The method of claim 1, wherein performing an interactive segmentation process to determine one or more contours of an object-of-interest in the query image further includes:
   feeding the query image through a fully connected convolutional network and a convolutional neural network message estimator for inferencing selective hidden-unit random field based on a personalized knowledge base;
   continuously back-propagating error derivatives with updated ground truth triggered by unsatisfied segmentation results of unseen images; and
   refining semantic segmentation and learning super-pixel selection criterion to build the personalized knowledge base.

3. The method of claim 2, wherein:
   given a set of observations x and the parameters $\theta$, a conditional probability of the segmentation label s is modeled as:

$$p(s=s_1, \ldots s_N | x, \theta) = \sum_h p(s, h | x, \theta) = \frac{\sum_h \exp(\psi(s, h, x; \theta))}{\sum_s \sum_h \exp(\psi(s, h, x; \theta))}$$

where $\psi(s,h,x;\theta) = \Sigma_i \phi_i^b(x_i,h_i) + \Sigma_{i,j \in E} \phi_{ij}^g(h_i,h_j,x_i,x_j) + \Sigma_n (\Sigma_i \phi_i^p)(s_n,h_n,x_i) + \phi^k(s_n))$;

the parameters $\theta$ are estimated by maximizing:

$$L(\theta) = \sum_d \log(p(s_d | x_d, \theta)) - \frac{1}{2\sigma^2}\|\theta\|^2; \text{ and}$$

the marginal distribution is calculated:

$$p(s_n | x, \theta) = \sum_{s \setminus s_n} p(s | x, s_n) = \frac{1}{Z_n} \exp\left[\sum_{F \in \mathcal{F}_p} \beta_{F \to p}(s_n)\right]$$

where $Z_n$ is a normalizer $Z_n = \sum_{s_n} \exp\left[\sum_{F \in \mathcal{F}_p} \beta_{F \to p}(s_n)\right]$.

4. A system for recommending an image-based route, comprising:
   an interactive segmentation module configured to obtain a query image from a user and perform an interactive segmentation process to determine on or more contours of an object-of-interest in the query image;
   a route searching module configured to determine a route having a maximum area overlap with the one or more contours of the object-of-interest on a map image; and
   a route recommending module configured to generate an output image including the object-of-interest and the route having the maximum area overlap with the contours of the object-of-interest, and to recommend the output image with the route to the user to be shared on a social network platform.

5. The system of claim 4, wherein the interactive segmentation module includes:
   an image selection unit configured to allow the user to select a query image;
   an image editing unit configured to allow the user to edit a super-pixel contour overlapping the query image by providing the foreground and background constraints;

an image processing unit configured to process the query image to generate one or more super-pixel contours through semantic image segmentation; and a personalized knowledge base unit configured to adaptively learn the user preferences or selection criteria with contextual cues in unseen settings to reduce the image editing effort by the user and to replace the user interactions eventually.

6. The system of claim 5, wherein:

the image processing unit also extracts and sends feedback from the user image editing to the personalized knowledge base unit; and the semantic image segmentation is performed through a selective random field approach.

7. The system of claim 6, wherein:

the image processing unit further includes a fully convolutional network and a super-pixel selector.

8. The system of claim 5, wherein:

the route searching module searches a route on Google map with a MorphSnakes algorithm.

9. The system of claim 5, wherein:

the route recommending module recommends a route having the maximum overlap area with the super-pixel contour generated by the interactive segmentation module to the user.

10. A non-transitory computer-readable medium having computer program for, when being executed by a processor, performing a method for recommending an image-based route, the method comprising:

obtaining a query image from a user;

performing an interactive segmentation process to determine one or more contours of an object-of-interest in the query image;

determining a route having a maximum area overlap with the one or more contours of the object-of-interest on a map image;

generating an output image including the object-of-interest and the route having the maximum area overlap with the contours of the object-of-interest; and recommending the output image with the route to the user, and sharing the output image on a social network platform.

11. The non-transitory computer-readable medium of claim 10, wherein performing an interactive segmentation process to determine one or more contours of an object-of-interest in the query image further includes:

feeding the query image through a fully connected convolutional network and a convolutional neural network message estimator for inferencing selective hidden-unit random field based on a personalized knowledge base;

continuously back-propagating error derivatives with updated ground truth triggered by unsatisfied segmentation results of unseen images; and refining semantic segmentation and learning super-pixel selection criterion to build the personalized knowledge base.

12. The non-transitory computer-readable medium of claim 11, wherein:

given a set of observations x and the parameters θ, a conditional probability of the segmentation label s is modeled as:

$$p(s=s_1,\ldots s_N | x, \theta) = \sum_h p(s,h|x,\theta) = \frac{\sum_h \exp(\psi(s,h,x;\theta))}{\sum_s \sum_h \exp(\psi(s,h,x;\theta))}$$

where $\psi(s,h,x;\theta) = \Sigma_i \phi_i^b(x_i,h_i) + \Sigma_{i,j \in E} \phi_{ij}^g(h_i,h_j,x_i,x_j) + \Sigma_n (\Sigma_i \phi_i^p)(s_n,h_i,x_i) + \phi^k(s_n))$;

the parameters θ are estimated by maximizing:

$$L(\theta) = \sum_d \log(p(s_d | x_d, \theta)) - \frac{1}{2\sigma^2}\|\theta\|^2; \text{ and}$$

the marginal distribution is calculated:

$$p(s_n | x, \theta) = \sum_{s \setminus s_n} p(s | x, s_n) = \frac{1}{Z_n}\exp\left[\sum_{F \in \mathcal{F}_P} \beta_{F \to p}(s_n)\right]$$

where $Z_n$ is a normalizer: $Z_n = E_{s_n} \exp[\Sigma_{F \Sigma \beta_P} \beta_{F \to p}(s_n)]$.

* * * * *